US012199375B2

(12) United States Patent
Wu et al.

(10) Patent No.: US 12,199,375 B2
(45) Date of Patent: Jan. 14, 2025

(54) ELECTRICAL CONNECTOR BODY WITH A RELIEF SLOT IN COMMUNICATION WITH A TERMINAL LIMITING SLOT

(71) Applicant: DONGGUAN LUXSHARE TECHNOLOGIES CO., LTD, Dongguan (CN)

(72) Inventors: Xiaoping Wu, Dongguan (CN); Rongzhe Guo, Dongguan (CN); Xiaogang Liu, Dongguan (CN); Chuanqi Gong, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 350 days.

(21) Appl. No.: 17/881,115

(22) Filed: Aug. 4, 2022

(65) Prior Publication Data

US 2023/0115326 A1 Apr. 13, 2023

(30) Foreign Application Priority Data

Oct. 13, 2021 (CN) .......................... 202111190071.9

(51) Int. Cl.
*H01R 13/58* (2006.01)

(52) U.S. Cl.
CPC .................................. *H01R 13/582* (2013.01)

(58) Field of Classification Search
CPC ...... H01R 13/40; H01R 13/405; H01R 13/46; H01R 13/41; H01R 13/02
See application file for complete search history.

(56) References Cited

U.S. PATENT DOCUMENTS

| | | | | |
|---|---|---|---|---|
| 5,695,353 A * | 12/1997 | Sakata | H01R 12/83 | 439/326 |
| 7,972,156 B2 * | 7/2011 | Zhou | H01R 12/7094 | 439/188 |
| 9,028,281 B2 * | 5/2015 | Kirk | H01R 12/724 | 439/701 |

(Continued)

FOREIGN PATENT DOCUMENTS

| | | |
|---|---|---|
| CN | 101017949 A | 8/2007 |
| CN | 201018073 Y | 2/2008 |

(Continued)

*Primary Examiner* — Vanessa Girardi

(74) *Attorney, Agent, or Firm* — Birch, Stewart, Kolasch & Birch, LLP

(57) ABSTRACT

An electrical connector includes an insulating body and a number of conductive terminals. The insulating body includes a mating slot. Each conductive terminal includes an elastic mating portion protruding into the mating slot and an end portion extending from the elastic mating portion. The insulating body is provided with a number of limiting blocks for limiting the conductive terminals and a terminal limiting slot located between two adjacent limiting blocks. At least one limiting block includes a limiting protrusion protruding into the terminal limiting slot for limiting a side surface of the end portion of the conductive terminal. The insulating body also includes a relief slot in communication with the terminal limiting slot. When the conductive terminal needs to be deformed, the end portion of the conductive terminal can move unimpeded in the relief slot.

20 Claims, 13 Drawing Sheets

(56) References Cited

U.S. PATENT DOCUMENTS

| | | | |
|---|---|---|---|
| 9,385,479 | B1 | 7/2016 | Schmitt et al. |
| 2014/0073151 | A1 | 3/2014 | Tsai et al. |
| 2020/0313358 | A1 | 10/2020 | Casher et al. |

FOREIGN PATENT DOCUMENTS

| | | | |
|---|---|---|---|
| CN | 201436693 | U | 4/2010 |
| CN | 202749545 | U | 2/2013 |
| CN | 103594832 | A | 2/2014 |
| CN | 104979691 | A | 10/2015 |
| CN | 107123882 | A | 9/2017 |
| CN | 206789762 | U | 12/2017 |
| CN | 209434452 | U | 9/2019 |
| CN | 111293462 | A | 6/2020 |
| CN | 112787166 | A | 5/2021 |
| EP | 0713612 | A1 | 5/1996 |
| JP | 2004-152754 | A | 5/2004 |
| TW | 201349671 | A | 12/2013 |
| WO | WO 95/05015 | A1 | 2/1995 |

* cited by examiner

ELECTRICAL CONNECTOR BODY WITH A RELIEF SLOT IN COMMUNICATION WITH A TERMINAL LIMITING SLOT

CROSS-REFERENCE TO RELATED APPLICATION

This patent application claims priority of a Chinese Patent Application No. 202111190071.9, filed on Oct. 13, 2021 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

An existing electrical connector usually includes an insulating body and a plurality of conductive terminals. In order to restrict the position of the conductive terminals, the insulating body usually defines a plurality of limiting slots. Since the conductive terminals need to be elastically deformed when they are mated with a mating connector, if the size control of the limiting slots is not accurate enough, it is easy to cause scratches between the insulating body and the conductive terminals, thereby affecting the reliability of the electrical connector.

SUMMARY

An object of the present disclosure is to provide an electrical connector with higher reliability.

In order to achieve the above object, the present disclosure adopts the following technical solution: an electrical connector, including: an insulating body, the insulating body including a mating surface and a mating slot extending through the mating surface along a first direction; and a plurality of conductive terminals, each conductive terminal including an elastic mating portion protruding into the mating slot and an end portion extending from the elastic mating portion; wherein the insulating body includes a plurality of limiting blocks to restrict the conductive terminals and a terminal limiting slot located between two adjacent limiting blocks; at least one limiting block includes a limiting protrusion protruding into the terminal limiting slot along a second direction perpendicular to the first direction; the at least one limiting protrusion is adapted to restrict a side surface of the end portion of a corresponding conductive terminal; wherein the insulating body further includes a relief slot adjacent to the mating surface, the relief slot and the terminal limiting slot are in communication with each other in the first direction; and when the corresponding conductive terminal needs to be deformed, the end portion of the corresponding conductive terminal is capable of moving unimpeded in the relief slot.

In order to achieve the above object, the present disclosure adopts the following technical solution: an electrical connector, including: an insulating body, the insulating body including a mating surface and a mating slot extending through the mating surface along a first direction; a first terminal module, the first terminal module including a plurality of first conductive terminals and a first fixing block to fix the first conductive terminals, each first conductive terminal including a first elastic mating portion protruding into the mating slot and a first end portion extending from the first elastic mating portion; a second terminal module, the second terminal module including a plurality of second conductive terminals and a second fixing block to fix the second conductive terminals, each second conductive terminal including a second elastic mating portion protruding into the mating slot; a third terminal module, the third terminal module including a plurality of third conductive terminals and a third fixing block to fix the third conductive terminals, each third conductive terminal including a third elastic mating portion protruding into the mating slot; and a fourth terminal module, the fourth terminal module including a plurality of fourth conductive terminals and a fourth fixing block to fix the fourth conductive terminals, each fourth conductive terminal including a fourth elastic mating portion protruding into the mating slot; wherein the first elastic mating portions of the first conductive terminals and the second elastic mating portions of the second conductive terminals are aligned in a vertical direction; wherein the third elastic mating portions of the third conductive terminals and the fourth elastic mating portions of the fourth conductive terminals are aligned in the vertical direction; wherein compared with the first elastic mating portions and the second elastic mating portions, the third elastic mating portions and the fourth elastic mating portions are disposed further away from the mating surface in the first direction; wherein the insulating body includes a first limiting block, a second limiting block, and a first terminal limiting slot located between the first limiting block and the second limiting block, the first limiting block includes a first protrusion, the second limiting block includes a second protrusion, the first protrusion protrudes toward the second protrusion in a second direction perpendicular to the first direction and the vertical direction, and the second protrusion protrudes toward the first protrusion in the second direction; wherein the first conductive terminals include a first signal terminal having the first end portion, the first end portion of the first signal terminal includes a first end surface, and the first end portion of the first signal terminal is restricted between the first protrusion and the second protrusion; wherein the insulating body further includes a first relief slot adjacent to the mating surface, the first relief slot and the first terminal limiting slot are in communication with each other in the first direction; and when the first signal terminal needs to be deformed, the first end portion of the first signal terminal is capable of moving unimpeded in the first relief slot.

Compared with the prior art, the present disclosure is capable of limiting the position of the conductive terminal by providing at least one limiting protrusion. In addition, by providing the relief slot, the end portion of the conductive terminal can move unimpeded in the relief slot, thereby reducing the probability of the conductive terminal being blocked when it needs to move, and improving the reliability of electrical connector. At the same time, the relief slot can also provide a positive impact on maintaining the signal integrity when the conductive terminals are transmitting signals.

DETAILED DESCRIPTION

Figure 1:
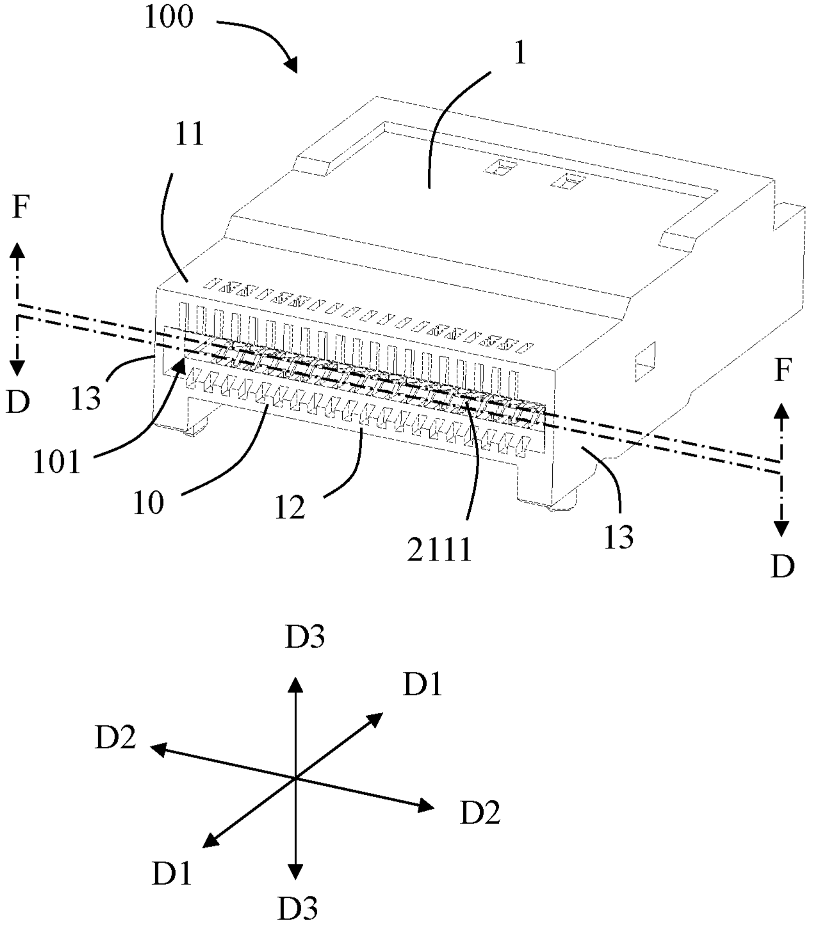
FIG. 1 is a schematic perspective view of an electrical connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 9, an illustrated embodiment of the present disclosure discloses an electrical connector 100. The electrical connector 100 is used for being mounted on a circuit board (not shown), and used for mating with a mating connector (not shown). In an embodiment of the present disclosure, the electrical connector 100 is a high-speed connector, including but not limited to, a QSFP connector, a QSFP-DD connector, a SFP connector, a SFP-DD connector or an OSFP connector, etc. The electrical connector 100 includes an insulating body 1 and a plurality of terminal modules installed in the insulating body 1. The terminal module includes a plurality of conductive terminals. Of course, in other embodiments, the plurality of conductive terminals may also be directly installed to the insulating body 1.

Figure 2:
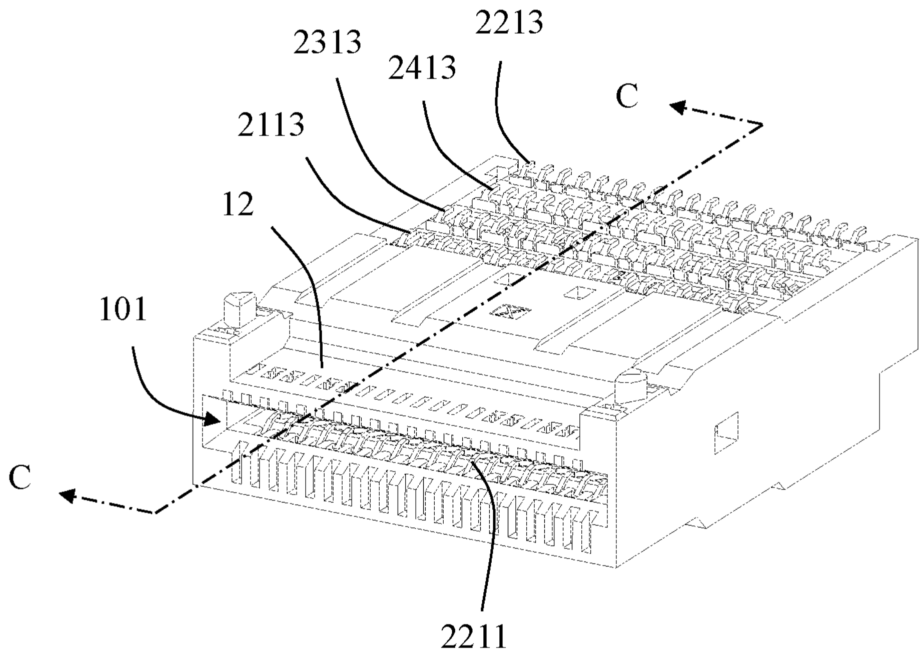
FIG. 2 is a schematic perspective view of FIG. 1 from another angle.
Figure 3:
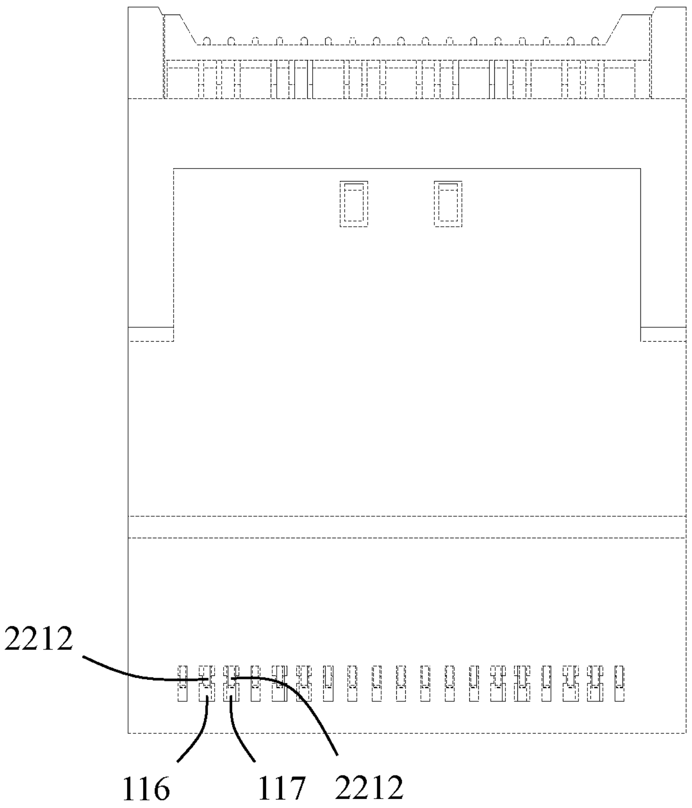
FIG. 3 is a top view of FIG. 1.
Figure 4:
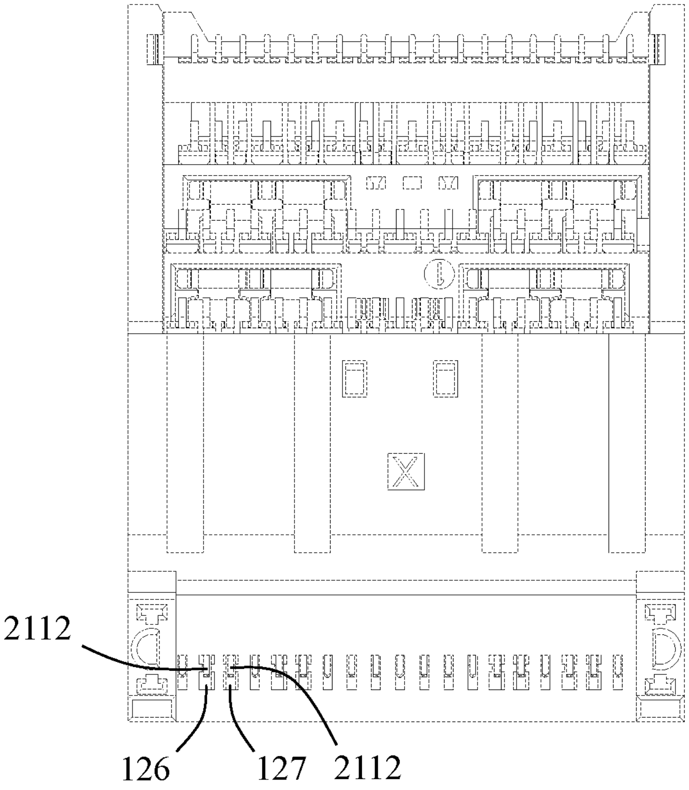
FIG. 4 is a top view of FIG. 2.

As shown in FIGS. 1 and 2, the insulating body 1 includes a mating surface 10 and a mating slot 101 extending through the mating surface 10 along a first direction D1-D1. Specifically, the insulating body 1 is of a substantially flat configuration. The insulating body 1 includes a top wall 11, a bottom wall 12, and two side walls 13 connecting the top wall 11 and the bottom wall 12. The insulating body 1 includes a plurality of limiting blocks adjacent to the mating surface 10 and a plurality of terminal limiting slots of which each is located between two adjacent limiting blocks. The insulating body 1 further includes a plurality of relief slots adjacent to the mating surface 10. The relief slots are in communication with corresponding terminal limiting slots in the first direction D1-D1. In the illustrated embodiment of the present disclosure, both a bottom of the top wall 11 and a top of the bottom wall 12 are provided with the plurality of limiting blocks.

Figure 5:
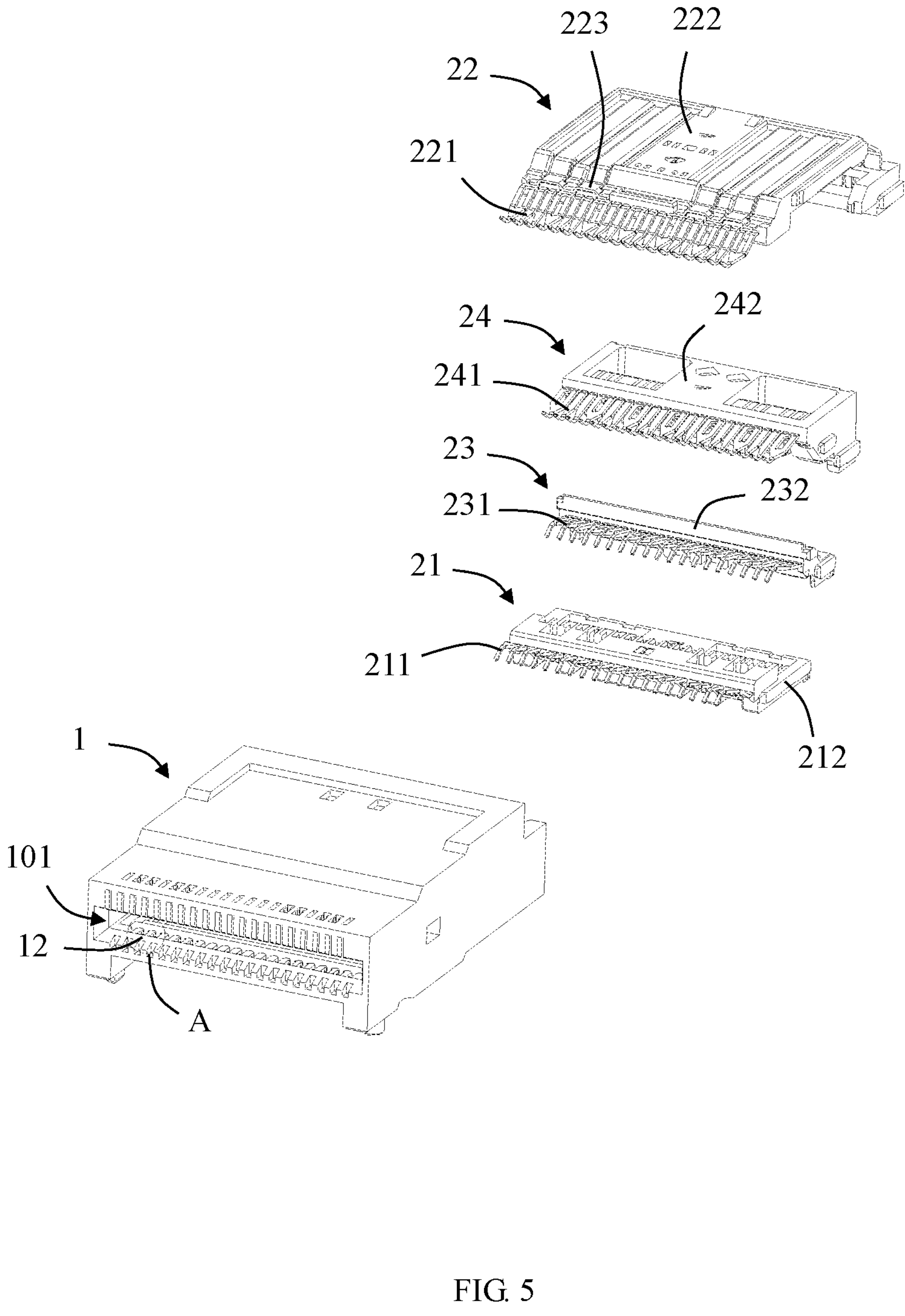
FIG. 5 is a partially exploded perspective view of FIG. 1.
Figure 6:
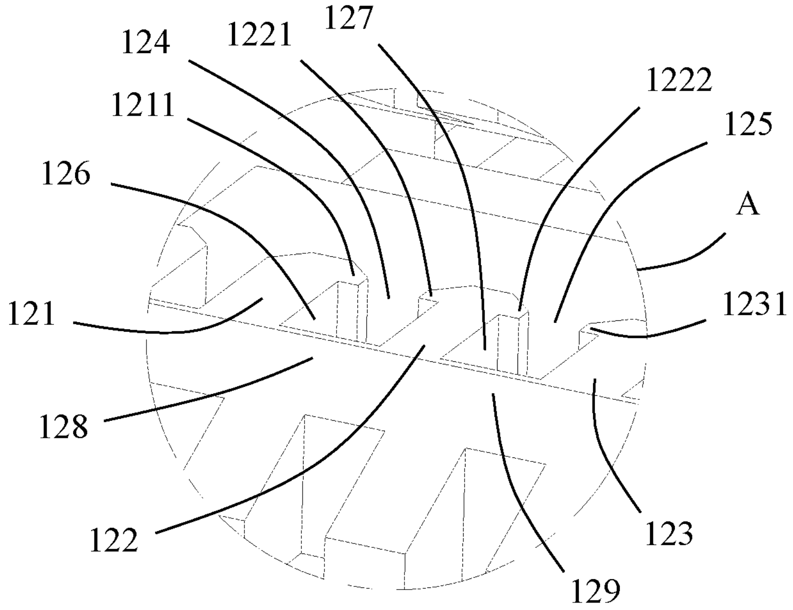
FIG. 6 is a partial enlarged view of a circled part A in FIG. 5.
Figure 7:
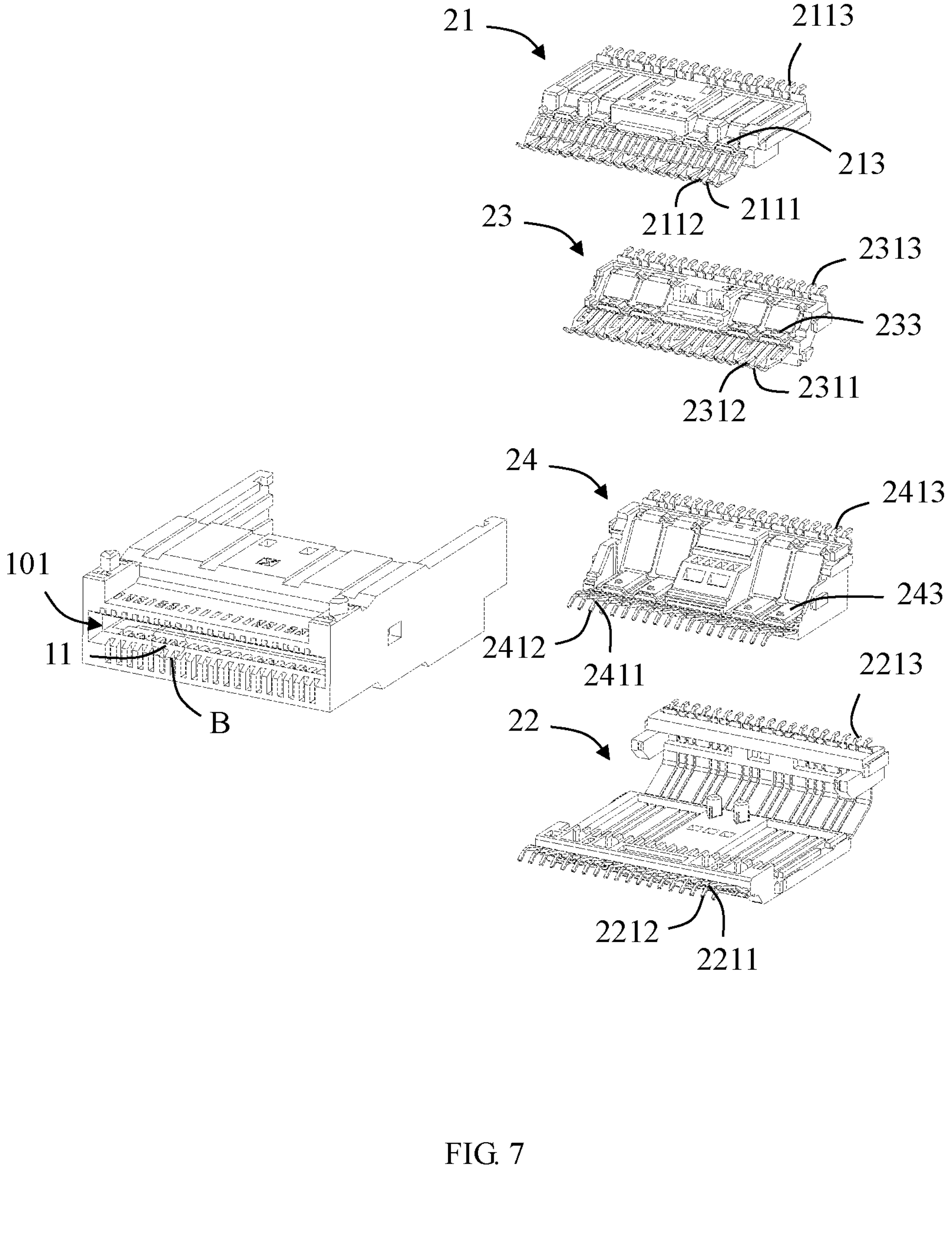
FIG. 7 is a partially exploded perspective view of FIG. 5 from another angle.
Figure 8:
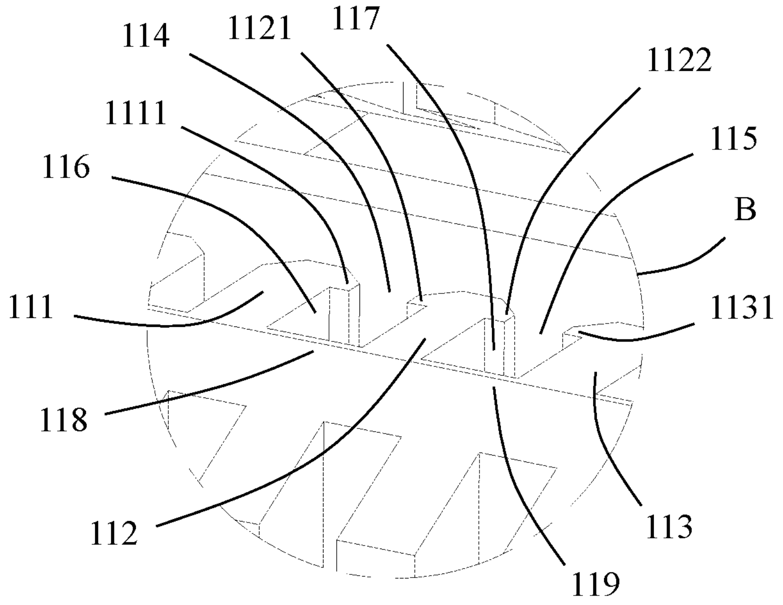
FIG. 8 is a partial enlarged view of a circled part B in FIG. 7.
Figure 9:
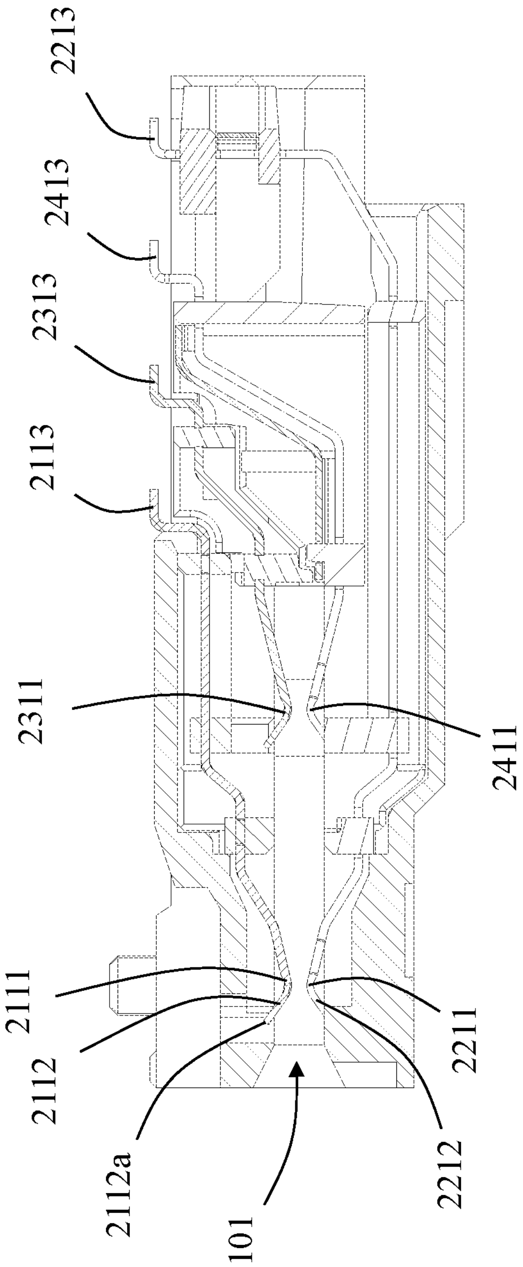
FIG. 9 is a schematic cross-sectional view taken along line C-C in FIG. 2.

Referring to FIGS. 5, 7 and 9, the plurality of terminal modules include a first terminal module 21, a second terminal module 22, a third terminal module 23 and a fourth terminal module 24. The first terminal module 21 and the second terminal module 22 are arranged opposite to each other along a vertical direction. The third terminal module 23 and the fourth terminal module 24 are arranged opposite to each other along the vertical direction. The structures of the first terminal module 21, the second terminal module 22, the third terminal module 23, and the fourth terminal module 24 are similar.

Figure 10:
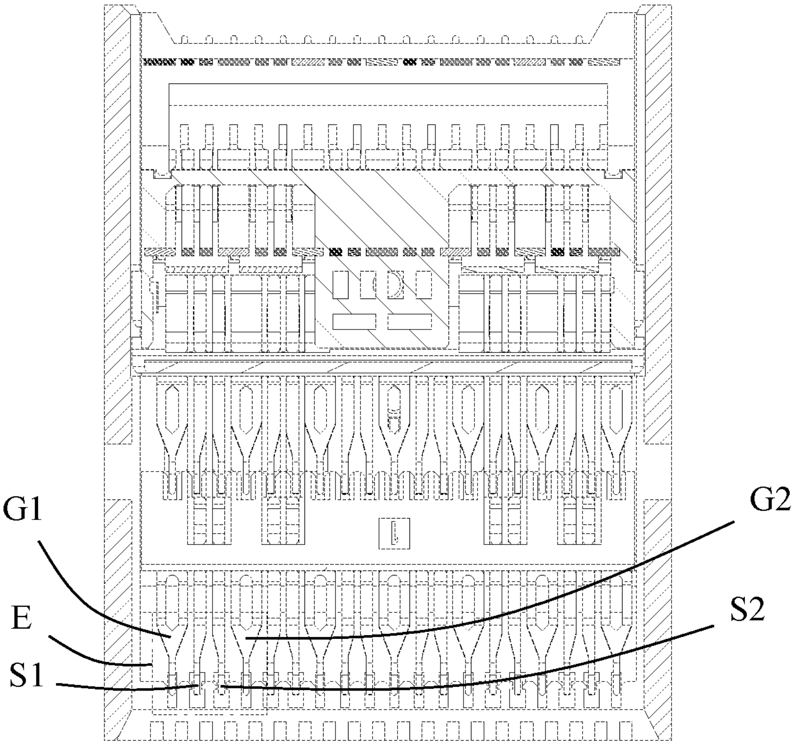
FIG. 10 is a schematic cross-sectional view taken along line D-D in FIG. 1.
Figure 11:
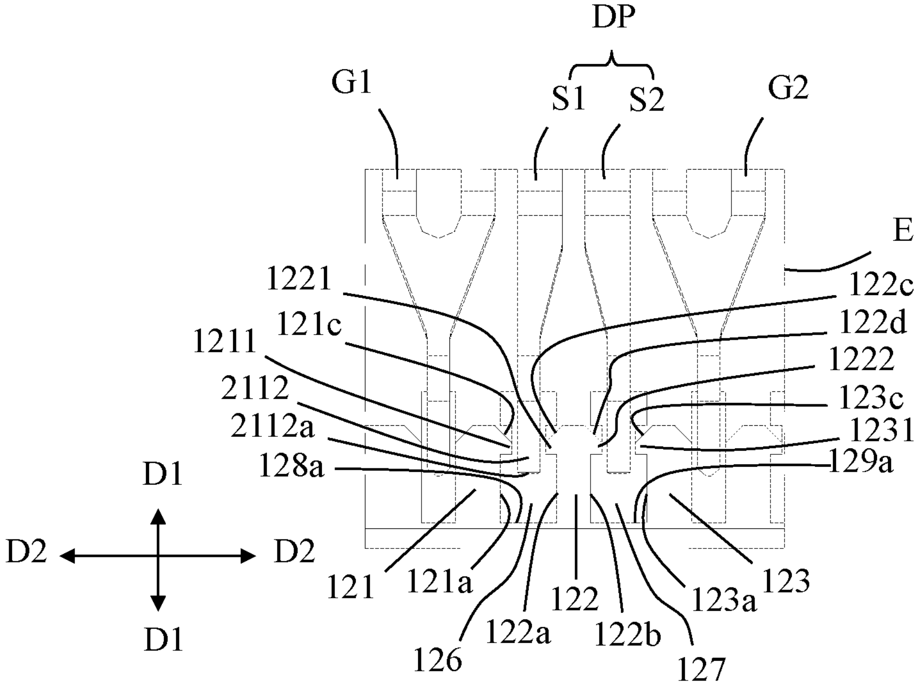
FIG. 11 is a partial enlarged view of a frame part E in FIG. 10.

The first terminal module 21 includes a plurality of first conductive terminals 211, a first fixing block 212 for fixing the first conductive terminals 211, and a first ground connection piece 213. In the illustrated embodiment of the present disclosure, the plurality of first conductive terminals 211 are insert-molded in the first fixing block 212, so that the first terminal module 21 is formed as a whole, thereby facilitating assembly. As shown in FIGS. 10 and 11, the plurality of first conductive terminals 211 include a plurality of differential signal terminal pairs DP, a plurality of first ground terminals G1 and a plurality of second ground terminals G2. Each differential signal terminal pair DP includes a first signal terminal S1 and a second signal terminal S2 which are disposed adjacent to each other. One first ground terminal G1 and one second ground terminal G2 are respectively provided on lateral sides of each differential signal terminal pair DP so as to improve the quality of signal transmission. The first ground connection piece 213 connects the first ground terminals G1 and the second ground terminals G2 so as to increase the grounding area and improve the grounding effect. In the illustrated embodiment of the present disclosure, a width of any one of the first ground terminals G1 and the second ground terminals G2 is larger than that of the first signal terminal S1 and the second signal terminal S2, thereby improving the shielding effect.

Each first conductive terminal 211 includes a first elastic mating portion 2111 protruding into the mating slot 101, a first end portion 2112 extending from the first elastic mating portion 2111, and a first mounting portion 2113 for being mounted to the circuit board. The first elastic mating portion 2111 has an arc-shaped configuration in order to contact a corresponding terminal of the mating connector. The first end portion 2112 includes a first end surface 2112*a*.

In the illustrated embodiment of the present disclosure, the plurality of limiting blocks include a first limiting block 121, a second limiting block 122 and a third limiting block 123. The first limiting block 121, the second limiting block 122 and the third limiting block 123 are all disposed on the top of the bottom wall 12. The terminal limiting slots include a first terminal limiting slot 124 located between the first limiting block 121 and the second limiting block 122, and a second terminal limiting slot 125 located between the second limiting block 122 and the third limiting block 123. The relief slot includes a first relief slot 126 located between the first limiting block 121 and the second limiting block 122, and a second relief slot 127 located between the second limiting block 122 and the third limiting block 123. The first relief slots 126 and corresponding first terminal limiting slots 124 are in communication with each other in the first direction D1-D1. The second relief slots 127 and corresponding second terminal limiting slots 125 are in communication with each other in the first direction D1-D1. The relief slots (for example, the first relief slot 126 and the second relief slot 127) have a function of adjusting impedance of the electrical connector 100. If the relief slot is not provided, the impedance of the electrical connector 100 is low. After the relief slot is set, the impedance of the electrical connector 100 is relatively high, which can improve the insertion loss resonance at the same time.

The limiting protrusions include a first protrusion 1211 provided on the first limiting block 121, a second protrusion 1221 and a fourth protrusion 1222 provided on the second limiting block 122, and a third protrusion 1231 provided on the third limiting block 123. The first protrusion 1211 protrudes toward the second protrusion 1221 in a second direction D2-D2 perpendicular to the first direction D1-D1. The second protrusion 1221 protrudes toward the first protrusion 1211 in the second direction D2-D2. The third protrusion 1231 protrudes toward the fourth protrusion 1222 in the second direction D2-D2. The fourth protrusion 1222 protrudes toward the third protrusion 1231 in the second direction D2-D2. In other words, the first protrusion 1211 and the second protrusion 1221 protrude toward each other in the second direction D2-D2. The third protrusion 1231 and the fourth protrusion 1222 protrude toward each other in the second direction D2-D2. The first end portion 2112 of the first signal terminal S1 is restricted between the first protrusion 1211 and the second protrusion 1221 so as to prevent the first end portion 2112 of the first signal terminal S1 from being deviated from side to side. In other words, opposite lateral sides of the first end portion 2112 of the first signal terminal S1 are restricted by the first protrusion 1211 and the second protrusion 1221, respectively. A gap between the first protrusion 1211 and the first end portion 2112 of the first signal terminal S1 along the second direction D2-D2 is X1, where 0.04 mm≤X1≤0.1 mm. A gap between the second protrusion 1221 and the first end portion 2112 of the first signal terminal S1 along the second direction D2-D2 is X2, where 0.04 mm≤X2≤0.1 mm. This arrangement is beneficial to improve the alignment of the first signal terminal S1. In an embodiment of the present disclosure, X1=0.05 mm, and X2=0.05 mm. The first end portion 2112 of the second signal terminal S2 is restricted between the third protrusion 1231 and the fourth protrusion 1222 so as to prevent the first end portion 2112 of the second signal terminal S2 from being deviated from side to side. In other words, opposite lateral sides of the first end portion 2112 of the second signal terminal S2 are restricted by the third protrusion 1231 and the fourth protrusion 1222, respectively. A gap between the third protrusion 1231 and the first end portion 2112 of the second signal terminal S2 along the second direction D2-D2 is X3, where 0.04 mm. A gap between the fourth protrusion 1222 and the first end portion 2112 of the second signal terminal S2 along the second direction D2-D2 is X4, where 0.04 mm≤X4≤0.1 mm. This arrangement is beneficial to improve the alignment of the second signal terminal S2. In an embodiment of the present disclosure, X3=0.05 mm, and X4=0.05 mm.

The first limiting block 121 includes a first side surface 121*a* exposed in the first relief slot 126. The second limiting block 122 includes a second side surface 122*a* exposed in the first relief slot 126. The third limiting block 123 includes a third side surface 123*a* exposed in the second relief slot 127. The second limiting block 122 further includes a fourth side surface 122*b* exposed in the second relief slot 127.

Referring to FIG. 11, in an embodiment of the present disclosure, the first side surface 121*a* and the second side surface 122*a* are parallel to each other. The third side surface 123*a* and the fourth side surface 122*b* are parallel to each other. A distance between the first side surface 121*a* and the second side surface 122*a* is greater than a width of the first end portion 2112 of the first signal terminal S1. A distance between the third side surface 123*a* and the fourth side surface 122*b* is greater than a width of the first end portion 2112 of the second signal terminal S2. In the illustrated embodiment of the present disclosure, the opposite lateral sides of the first end portion 2112 of the first signal terminal S1 are separated from the first side surface 121*a* and the second side surface 122*a* by a certain distance, respectively. The opposite lateral sides of the first end portion 2112 of the second signal terminal S2 are separated from the third side surface 123*a* and the fourth side surface 122*b* by a certain distance, respectively. With this arrangement, when the first signal terminal S1 needs to be deformed, the first end portion 2112 of the first signal terminal S1 can move unimpeded in the first relief slot 126. When the second signal terminal S2 needs to be deformed, the first end portion 2112 of the second signal terminal S2 can move unimpeded in the second relief slot 127. With this design of the present disclosure, since protruding areas of the first protrusion 1211 and the second protrusion 1221, as well as protruding areas of the third protrusion 1231 and the fourth protrusion 1222 are relatively small, the risk of scratches of the first signal terminal S1 and the second signal terminal S2 when moving with respect to the insulating body 1 is reduced, and the reliability of the electrical connector 100 is improved. By providing the first relief slot 126 and the second relief slot 127, the risk of scratches of the first signal terminal S1 and the second signal terminal S2 when moving with respect to the insulating body 1 is further reduced. At the same time, the first relief slot 126 and the second relief slot 127 can also have a positive impact on maintaining signal integrity when the first signal terminal S1 and the second signal terminal S2 are transmitting signals. In the illustrated embodiment of the present disclosure, the first terminal limiting slot 124, the second terminal limiting slot 125, the first relief slot 126, and the second relief slot 127 extend through the insulating body 1 along a third direction D3-D3 perpendicular to the first direction D1-D1 and the second direction D2-D2. This design is beneficial to a more positive impact on maintaining the signal integrity, and is beneficial to improve heat dissipation as well.

Figure 14:
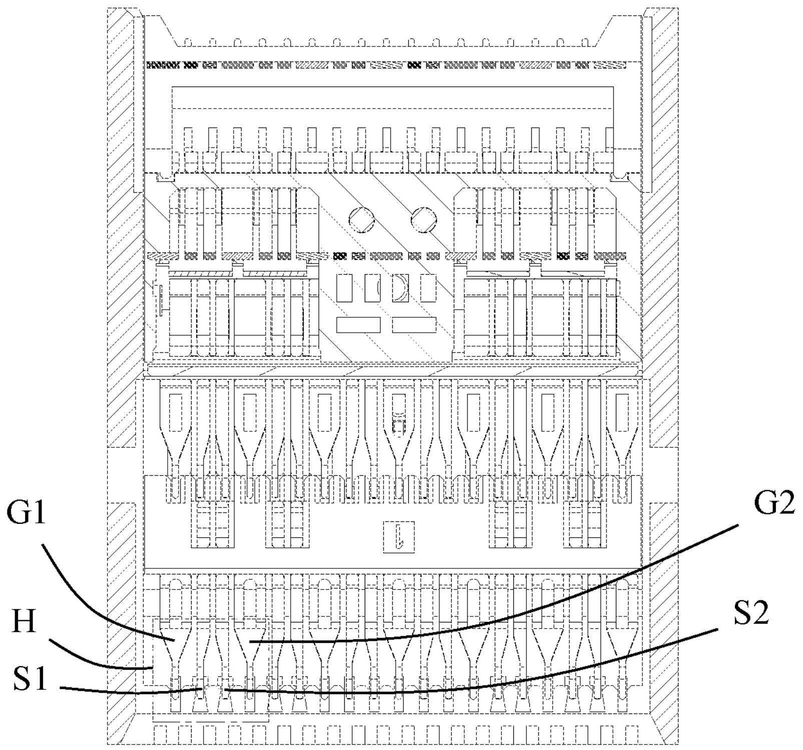
FIG. 14 is a schematic cross-sectional view of FIG. 10 in accordance with another embodiment of the present disclosure.
Figure 15:
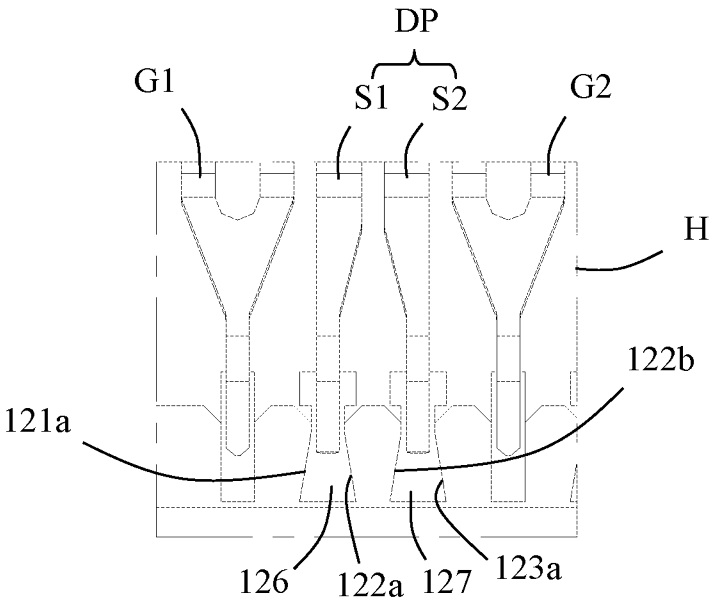
FIG. 15 is a partial enlarged view of a frame part H in FIG. 14.

Referring to FIGS. 14 and 15, in another embodiment of the present disclosure, the first side surface 121*a* and the second side surface 122*a* are both inclined surfaces, and the third side surface 123*a* and the fourth side surface 122*b* are also inclined surfaces. An inclination direction of the first side surface 121*a* is opposite to that of the second side surface 122*a*. An inclination direction of the third side surface 123*a* is opposite to that of the fourth side surface 122*b*. The minimum distance between the first side surface 121*a* and the second side surface 122*a* is greater than the width of the first end portion 2112 of the first signal terminal S1. Besides, the farther away from the first end surface 2112*a* of the first signal terminal S1 in the first direction D1-D1, the greater the distance. The minimum distance between the third side surface 123*a* and the fourth side surface 122*b* is greater than the width of the first end portion 2112 of the second signal terminal S2. Besides, the farther away from the first end surface 2112*a* of the second signal terminal S2 in the first direction D1-D1, the greater the distance. In the illustrated embodiment of the present disclosure, opposite lateral sides of the first end portion 2112 of the first signal terminal S1 are separated from the first side surface 121*a* and the second side surface 122*a* by a certain distance, respectively. Opposite lateral sides of the first end portion 2112 of the second signal terminal S2 are separated from the third side surface 123*a* and the fourth side surface 122*b* by a certain distance, respectively. With this arrangement, when the first signal terminal S1 needs to be deformed, the first end portion 2112 of the first signal terminal S1 can move unimpeded in the first relief slot 126. When the second signal terminal S2 needs to be deformed, the first end portion 2112 of the second signal terminal S2 can move unimpeded in the second relief slot 127. The design of the present disclosure reduces the risk of scratches of the first signal terminal S1 and the second signal terminal S2 when moving with respect to the insulating body 1, and improves the reliability of the electrical connector 100. At the same time, the first relief slot 126 and the second relief slot 127 can also have a positive impact on maintaining signal integrity when the first signal terminal S1 and the second signal terminal S2 are transmitting signals. In the illustrated embodiment of the present disclosure, the first terminal limiting slot 124, the second terminal limiting slot 125, the first relief slot 126, and the second relief slot 127 extend through the insulating body 1 along a third direction D3-D3 perpendicular to the first direction D1-D1 and the second direction D2-D2. This design is beneficial to a more positive impact on maintaining the signal integrity, and is beneficial to improve heat dissipation as well.

The insulating body 1 includes a first connecting wall 128 connecting the first limiting block 121 and the second limiting block 122, and a second connecting wall 129 connecting the second limiting block 122 and the third limiting block 123. The first connecting wall 128 includes a first surface 128*a*. The first relief slot 126 is located between the first surface 128*a* and the first end surface 2112*a* of the first signal terminal S1 in the first direction D1-D1. The second connecting wall 129 includes a second surface 129*a*. The second relief slot 127 is located between the second surface 129*a* and the first end surface 2112*a* of the second signal terminal S2 in the first direction D1-D1.

The first limiting block 121 includes a first inclined guide surface 121*c*. The second limiting block 122 includes a second inclined guide surface 122*c*. The first inclined guide surface 121*c* and the second inclined guide surface 122*c* jointly form a first bell mouth for guiding the first end portion 2112 of the first signal terminal S1. The third limiting block 123 includes a third inclined guide surface 123*c*. The second limiting block 122 further includes a fourth inclined guide surface 122*d*. The third inclined guide surface 123*c* and the fourth inclined guide surface 122*d* jointly form a second bell mouth for guiding the first end portion 2112 of the second signal terminal S2. By providing the first bell mouth and the second bell mouth, the first terminal module 21 can be easily assembled into the insulating body 1.

Referring to FIGS. 5 and 7, the second terminal module 22 includes a plurality of second conductive terminals 221, a second fixing block 222 for fixing the second conductive terminals 221, and a second ground connection piece 223. In the illustrated embodiment of the present disclosure, the plurality of second conductive terminals 221 are insert-molded in the second fixing block 222, so that the second terminal module 22 is formed as a whole, thereby facilitating assembly.

Figure 12:
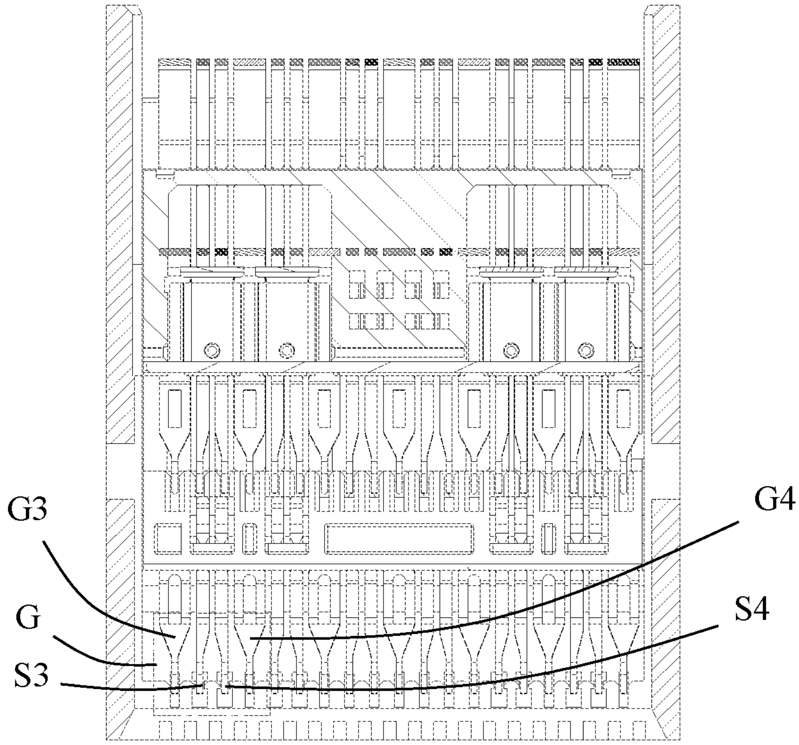
FIG. 12 is a schematic cross-sectional view taken along line F-F in FIG. 1.
Figure 13:
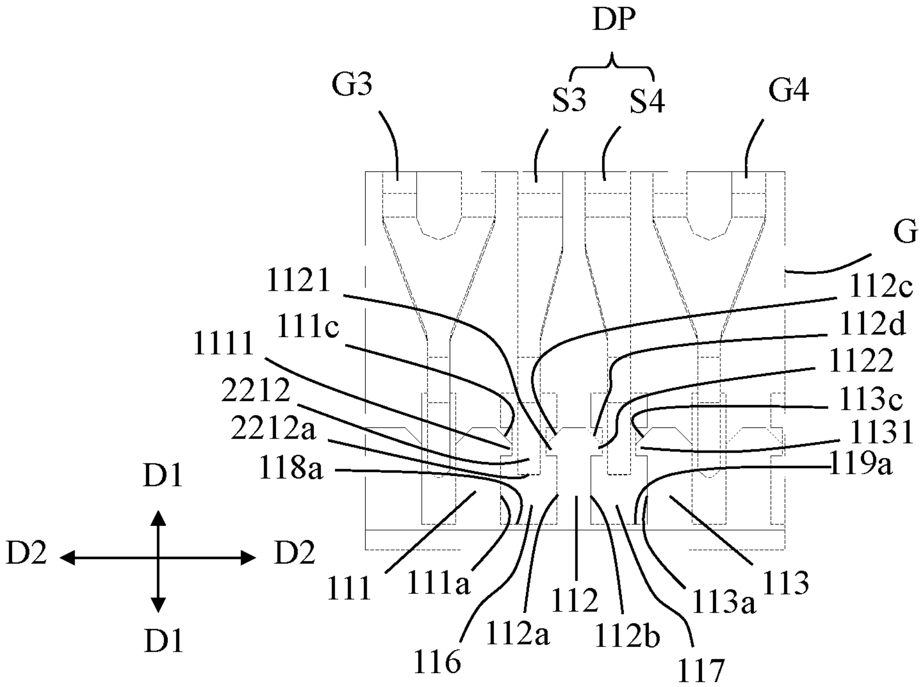
FIG. 13 is a partial enlarged view of a frame part Gin FIG. 12.

As shown in FIGS. 12 and 13, the plurality of second conductive terminals 221 include a plurality of differential signal terminal pairs DP, a plurality of third ground terminals G3, and a plurality of fourth ground terminals G4. Each differential signal terminal pair DP includes a third signal terminal S3 and a fourth signal terminal S4 which are disposed adjacent to each other. One third ground terminal G3 and one fourth ground terminal G4 are respectively provided on opposite lateral sides of each differential signal terminal pair DP so as to improve the quality of signal transmission. The second ground connection piece 223 connects the third ground terminals G3 and the fourth ground terminals G4 so as to increase the grounding area and improve the grounding effect. In the illustrated embodiment of the present disclosure, a width of any one of the third ground terminal G3 and the fourth ground terminal G4 is larger than that of the third signal terminal S3 and the fourth signal terminal S4, thereby improving the shielding effect.

Each second conductive terminal 221 includes a second elastic mating portion 2211 protruding into the mating slot 101, a second end portion 2212 extending from the second elastic mating portion 2211, and a second mounting portion 2213 for being mounted to the circuit board. The second elastic mating portion 2211 has an arc-shaped configuration to contact a corresponding terminal of the mating connector. The second end portion 2212 includes a second end surface 2212*a*.

In the illustrated embodiment of the present disclosure, the plurality of limiting blocks include a fourth limiting block 111, a fifth limiting block 112 and a sixth limiting block 113. The fourth limiting block 111, the fifth limiting block 112 and the sixth limiting block 113 are all disposed at the bottom of the top wall 11. The terminal limiting slots include a third terminal limiting slot 114 located between the fourth limiting block 111 and the fifth limiting block 112, and a fourth terminal limiting slot 115 located between the fifth limiting block 112 and the sixth limiting block 113. The relief slots include a third relief slot 116 located between the fourth limiting block 111 and the fifth limiting block 112, and a fourth relief slot 117 located between the fifth limiting block 112 and the sixth limiting block 113. The third relief slots 116 and the corresponding third terminal limiting slots 114 are in communication with each other in the first direction D1-D1. The fourth relief slots 117 and the corresponding fourth terminal limiting slots 115 are in communication with each other in the first direction D1-D1.

The limiting protrusions include a fifth protrusion 1111 provided on the fourth limiting block 111, a sixth protrusion 1121 and an eighth protrusion 1122 provided on the fifth limiting block 112, and a seventh protrusion 1131 provided on the sixth limiting block 113. The fifth protrusion 1111 protrudes toward the sixth protrusion 1121 in a second direction D2-D2 perpendicular to the first direction D1-D1. The sixth protrusion 1121 protrudes toward the fifth protrusion 1111 in the second direction D2-D2. The seventh protrusion 1131 protrudes toward the eighth protrusion 1122 in the second direction D2-D2. The eighth protrusion 1122 protrudes toward the seventh protrusion 1131 in the second direction D2-D2. In other words, the fifth protrusion 1111 and the sixth protrusion 1121 protrude toward each other in the second direction D2-D2. The seventh protrusion 1131 and the eighth protrusion 1122 protrude toward each other in the second direction D2-D2. The second end portion 2212 of the third signal terminal S3 is restricted between the fifth protrusion 1111 and the sixth protrusion 1121 so as to prevent the second end portion 2212 of the third signal terminal S3 from being deviated from side to side. In other words, opposite lateral sides of the second end portion 2212 of the third signal terminal S3 are restricted by the fifth protrusion 1111 and the sixth protrusion 1121, respectively. A gap between the fifth protrusion 1111 and the second end portion 2212 of the third signal terminal S3 along the second direction D2-D2 is X5, where $0.04\ mm \le X5 \le 0.1\ mm$. A gap between the sixth protrusion 1121 and the second end portion 2212 of the third signal terminal S3 along the second direction D2-D2 is X6, where $0.04\ mm \le X6 \le 0.1\ mm$. This arrangement is beneficial to improve the alignment of the third signal terminal S3. In an embodiment of the present disclosure, X5=0.05 mm, and X6=0.05 mm. The second end portion 2212 of the fourth signal terminal S4 is restricted between the seventh protrusion 1131 and the eighth protrusion 1122 so as to prevent the second end portion 2212 of the fourth signal terminal S4 from being deviated from side to side. In other words, opposite lateral sides of the second end portion 2212 of the fourth signal terminal S4 are restricted by the seventh protrusion 1131 and the eighth protrusion 1122, respectively. A gap between the seventh protrusion 1131 and the second end portion 2212 of the fourth signal terminal S4 along the second direction D2-D2 is X7, where $0.04\ mm \le X7 \le 0.1\ mm$. A gap between the eighth protrusion 1122 and the second end portion 2212 of the fourth signal terminal S4 along the second direction D2-D2 is X8, where $0.04\ mm \le X8 \le 0.1\ mm$. This arrangement is beneficial to improve the alignment of the fourth signal terminal S4. In an embodiment of the present disclosure, X7=0.05 mm, and X8=0.05 mm.

The fourth limiting block 111 includes a fifth side surface 111*a* exposed in the third relief slot 116. The fifth limiting block 112 includes a sixth side surface 112*a* exposed in the third relief slot 116. The sixth limiting block 113 includes a seventh side surface 113*a* exposed in the fourth relief slot 117. The fifth limiting block 112 further includes an eighth side surface 112*b* exposed in the fourth relief slot 117.

Referring to FIGS. 12 and 13, in an embodiment of the present disclosure, the fifth side surface 111*a* and the sixth side surface 112*a* are parallel to each other, and the seventh side surface 113*a* and the eighth side surface 112*b* are parallel to each other. A distance between the fifth side surface 111*a* and the sixth side surface 112*a* is greater than the width of the second end portion 2212 of the third signal terminal S3. A distance between the seventh side surface 113*a* and the eighth side surface 112*b* is greater than the width of the second end portion 2212 of the fourth signal terminal S4. In the illustrated embodiment of the present disclosure, opposite lateral sides of the second end portion 2212 of the third signal terminal S3 are separated from the fifth side surface 111*a* and the sixth side surface 112*a* by a certain distance, respectively. Opposite lateral sides of the second end portion 2212 of the fourth signal terminal S4 are separated from the seventh side surface 113*a* and the eighth side surface 112*b* by a certain distance, respectively. With this arrangement, when the third signal terminal S3 needs to be deformed, the second end portion 2212 of the third signal terminal S3 can move unimpeded in the third relief slot 116. When the fourth signal terminal S4 needs to be deformed, the second end portion 2212 of the fourth signal terminal S4 can move unimpeded in the fourth relief slot 117. The design of the present disclosure reduces the risk of scratches of the third signal terminal S3 and the fourth signal terminal S4 when moving with respect to the insulating body 1, and improves the reliability of the electrical connector 100. At the same time, the third relief slot 116 and the fourth relief slot 117 can also a positive impact on maintaining signal integrity when the third signal terminal S3 and the fourth signal terminal S4 are transmitting signals. In the illustrated embodiment of the present disclosure, the third terminal limiting slot 114, the fourth terminal limiting slot 115, the third limiting slot 116, and the fourth limiting slot 117 extend through the insulating body 1 along a third direction D3-D3 perpendicular to the first direction D1-D1 and the second direction D2-D2. This design is beneficial to a more positive impact on maintaining the signal integrity, and is beneficial to improve heat dissipation as well.

Figure 16:
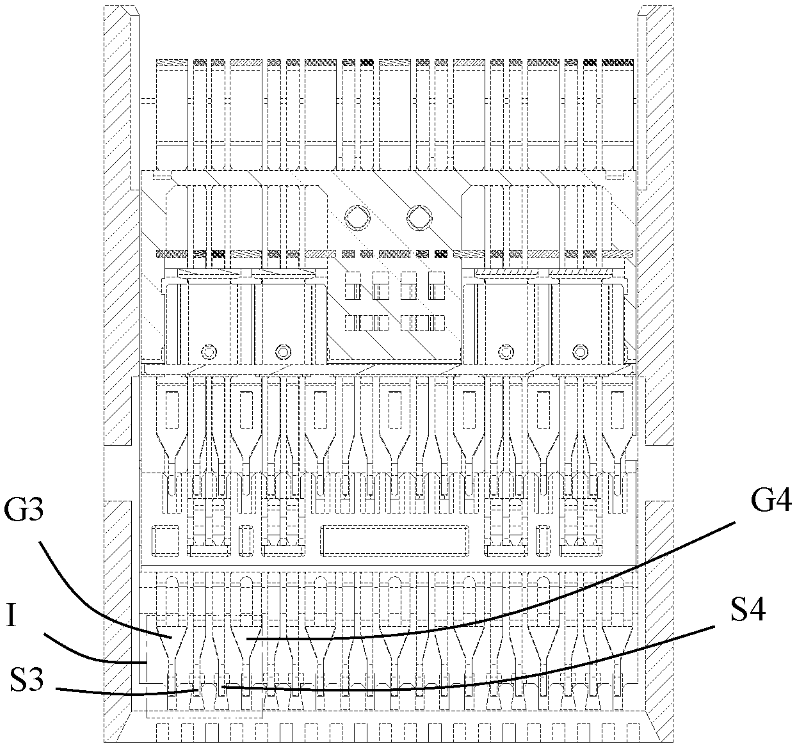
FIG. 16 is a schematic cross-sectional view of FIG. 12 in accordance with another embodiment of the present disclosure.
Figure 17:
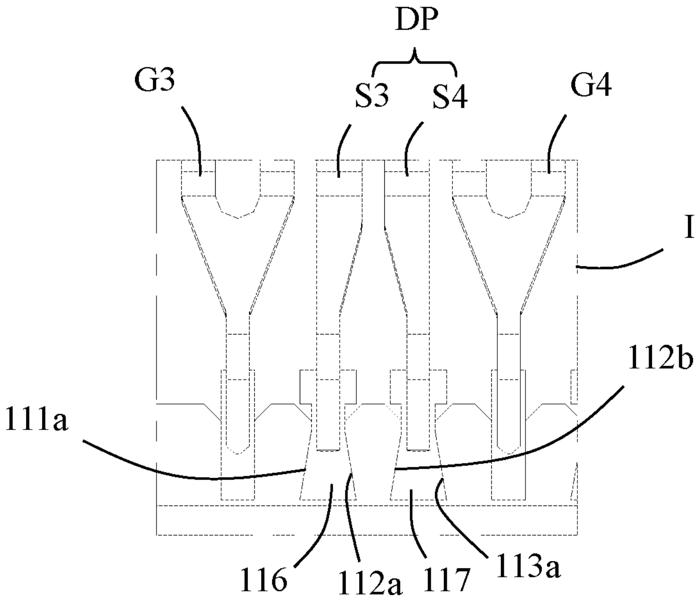
FIG. 17 is a partial enlarged view of a frame portion I in FIG. 16.

Referring to FIGS. 16 and 17, in another embodiment of the present disclosure, the fifth side surface 111*a* and the sixth side surface 112*a* are both inclined surfaces. The seventh side surface 113*a* and the eighth side surface 112*b* are also inclined surfaces. An inclination direction of the fifth side surface 111*a* is opposite to that of the sixth side surface 112*a*. An inclination direction of the seventh side surface 113*a* is opposite to that of the eighth side surface 112*b*. The minimum distance between the fifth side surface 111*a* and the sixth side surface 112*a* is greater than the width of the second end portion 2212 of the third signal terminal S3. Besides, the farther away from the second end surface 2212*a* of the third signal terminal S3 in the first direction D1-D1, the greater the distance. The minimum distance between the seventh side surface 113*a* and the eighth side surface 112*b* is greater than the width of the second end portion 2212 of the fourth signal terminal S4. Besides, the farther away from the second end surface 2212*a* of the fourth signal terminal S4 in the first direction D1-D1, the greater the distance. In the illustrated embodiment of the present disclosure, opposite lateral sides of the second end portion 2212 of the third signal terminal S3 are separated from the fifth side surface 111*a* and the sixth side surface 112*a* by a certain distance, respectively. Opposite lateral sides of the second end portion 2212 of the fourth signal terminal S4 are separated from the seventh side surface 113*a* and the eighth side surface 112*b* by a certain distance, respectively. With this arrangement, when the third signal terminal S3 needs to be deformed, the second end portion 2212 of the third signal terminal S3 can move unimpeded in the third relief slot 116. When the fourth signal terminal S4 needs to be deformed, the second end portion 2212 of the fourth signal terminal S4 can move unimpeded in the fourth relief slot 117. The design of the present disclosure reduces the risk of scratches of the third signal terminal S3 and the fourth signal terminal S4 when moving with respect to the insulating body 1, and improves the reliability of the electrical connector 100. At the same time, the third relief slot 116 and the fourth relief slot 117 can also have a positive impact on maintaining signal integrity when the third signal terminal S3 and the fourth signal terminal S4 are transmitting signals. In the illustrated embodiment of the present disclosure, the third terminal limiting slot 114, the fourth terminal limiting slot 115, the third limiting slot 116, and the fourth limiting slot 117 extend through the insulating body 1 along the third direction D3-D3 perpendicular to the first direction D1-D1 and the second direction D2-D2. This design is beneficial to a more positive impact on maintaining the signal integrity, and is beneficial to improve heat dissipation as well.

The insulating body 1 includes a third connecting wall 118 connecting the fourth limiting block 111 and the fifth limiting block 112, and a fourth connecting wall 119 connecting the fifth limiting block 112 and the sixth limiting block 113. The third connecting wall 118 includes a third surface 118*a*. The third relief slot 116 is located between the third surface 118*a* and the second end surface 2212*a* of the third signal terminal S3 in the first direction D1-D1. The fourth connecting wall 119 includes a fourth surface 119*a*. The fourth relief slot 117 is located between the fourth surface 119*a* and the second end surface 2212*a* of the fourth signal terminal S4 in the first direction D1-D1.

The fourth limiting block 111 includes a third inclined guide surface 111*c*. The fifth limiting block 112 includes a fourth inclined guide surface 112*c*. The third inclined guide surface 111*c* and the fourth inclined guide surface 112*c* jointly form a third bell mouth for guiding the second end portion 2212 of the third signal terminal S3. The sixth limiting block 113 includes a third inclined guide surface 113*c*. The fifth limiting block 112 further includes a fourth inclined guide surface 112*d*. The third inclined guide surface 113*c* and the fourth inclined guide surface 112*d* jointly form a fourth bell mouth for guiding the second end portion 2212 of the fourth signal terminal S4. By providing the third bell mouth and the fourth bell mouth, the second terminal module 22 can be easily assembled into the insulating body 1.

Referring to FIG. 9, the first elastic mating portion 2111 of the first conductive terminal 211 and the second elastic mating portion 2211 of the second conductive terminal 221 are aligned in the third direction D3-D3, and are used to jointly clamp a tongue plate of the mating connector so as to improve the mating stability.

Referring to FIGS. 5 and 7, the third terminal module 23 includes a plurality of third conductive terminals 231, a third fixing block 232 for fixing the third conductive terminals 231, and a third ground connection piece 233. In the illustrated embodiment of the present disclosure, the plurality of third conductive terminals 231 are insert-molded in the third fixing block 232, so that the third terminal module 23 is formed as a whole, thereby facilitating assembly. Each third conductive terminal 231 includes a third elastic mating portion 2311 protruding into the mating slot 101, a third end portion 2312 extending from the third elastic mating portion 2311, and a third mounting portion 2313 for being mounted to the circuit board. The third elastic mating portion 2311 has an arc-shaped configuration to contact a corresponding terminal of the mating connector.

Referring to FIGS. 5 and 7, the fourth terminal module 24 includes a plurality of fourth conductive terminals 241, a fourth fixing block 242 for fixing the fourth conductive terminals 241, and a fourth ground connection piece 243. In the illustrated embodiment of the present disclosure, the plurality of fourth conductive terminals 241 are insert-molded in the fourth fixing block 242, so that the fourth terminal module 24 is formed as a whole, thereby facilitating assembly. Each fourth conductive terminal 241 includes a fourth elastic mating portion 2411 protruding into the mating slot 101, a fourth end portion 2412 extending from the fourth elastic mating portion 2411, and a fourth mounting portion 2413 for being mounted to the circuit board. The fourth elastic mating portion 2411 has an arc-shaped configuration to contact a corresponding terminal of the mating connector.

Referring to FIG. 9, the third elastic mating portion 2311 of the third conductive terminal 231 and the fourth elastic mating portion 2411 of the fourth conductive terminal 241 are aligned in the third direction D3-D3, and are used to jointly clamp the tongue plate of the mating connector so as to improve the mating stability. Compared with the first elastic mating portion 2111 of the first conductive terminal 211 and the second elastic mating portion 2211 of the second conductive terminal 221, the third elastic mating portion 2311 of the third conductive terminal 231 and the fourth elastic mating portion 2411 of the fourth conductive terminal 241 are further away from the mating surface 10 in the first direction D1-D1. The first mounting portion 2113, the third mounting portion 2313, the fourth mounting portion 2413, and the second mounting portion 2213 are sequentially arranged at intervals along the first direction D-D1.

The above embodiments are only used to illustrate the present disclosure and not to limit the technical solutions described in the present disclosure. The understanding of this specification should be based on those skilled in the art. Descriptions of directions, such as “front”, “back”, “left”, “right”, “top” and “bottom”, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body, the insulating body comprising a mating surface and a mating slot extending through the mating surface along a first direction; and a plurality of conductive terminals, each conductive terminal comprising an elastic mating portion protruding into the mating slot and an end portion extending from the elastic mating portion along the first direction; the end portion being disposed at a free end of the conductive terminal;

wherein the insulating body comprises a plurality of limiting blocks to restrict the conductive terminals and a terminal limiting slot located between two adjacent limiting blocks; at least one limiting block comprises a limiting protrusion protruding into the terminal limiting slot along a second direction perpendicular to the first direction; the at least one limiting protrusion is adapted to restrict a side surface of the end portion of a corresponding conductive terminal;

wherein the insulating body further comprises a relief slot adjacent to the mating surface, the relief slot and the terminal limiting slot are in communication with each other in the first direction; the relief slot does not extend through the mating surface along the first direction; the end portion at least partially extends into the relief slot along the first direction;

wherein the relief slot has a distal end away from and spaced apart from the end portion of the corresponding conductive terminal along the first direction; the distal end has an end width along the second direction that is greater than a width of the end portion along the second direction, such that when the corresponding conductive terminal is subjected to a force along a third direction and needs to be deformed, the end portion of the corresponding conductive terminal is capable of moving unimpeded in the relief slot; the third direction is perpendicular to the first direction and the second direction.

2. The electrical connector according to claim 1, wherein the terminal limiting slot and the relief slot extend through the insulating body in the third direction.

3. The electrical connector according to claim 1, wherein the relief slot is capable of adjusting an impedance of the electrical connector.

4. The electrical connector according to claim 1, wherein the plurality of limiting blocks comprises a first limiting block and a second limiting block, the terminal limiting slot comprises a first terminal limiting slot located between the first limiting block and the second limiting block, the limiting protrusion comprises a first protrusion provided on the first limiting block and a second protrusion provided on the second limiting block, the first protrusion protrudes toward the second protrusion in the second direction, and the second protrusion protrudes toward the first protrusion in the second direction;

wherein the conductive terminals comprise a first signal terminal, the end portion comprises a first end portion provided on the first signal terminal, the first end portion of the first signal terminal comprises a first end surface, and the first end portion of the first signal terminal is restricted between the first protrusion and the second protrusion.

5. The electrical connector according to claim 4, wherein the relief slot comprises a first relief slot located between the first limiting block and the second limiting block in the second direction, the first limiting block comprises a first side surface exposed in the first relief slot, the second limiting block comprises a second side surface exposed in the first relief slot, the first side surface and the second side surface are parallel to each other, a distance between the first side surface and the second side surface is greater than a width of the first end portion of the first signal terminal.

6. The electrical connector according to claim 5, wherein the insulating body comprises a first connecting wall connecting the first limiting block and the second limiting block, the first connecting wall comprises a first surface, the first relief slot is located between the first surface and the first end surface of the first signal terminal in the first direction.

7. The electrical connector according to claim 4, wherein the relief slot comprises a first relief slot located between the first limiting block and the second limiting block in the second direction, the first limiting block comprises a first side surface exposed in the first relief slot, the second limiting block comprises a second side surface exposed in the first relief slot, the first side surface and the second side surface are both inclined surfaces, the first side surface and the second side surface have opposite inclination directions, a distance between the first side surface and the second side surface is greater than a width of the first end portion of the first signal terminal, and the farther the distance from the first end surface of the first signal terminal in the first direction is, the greater the distance.

8. The electrical connector according to claim 7, wherein the insulating body comprises a first connecting wall connecting the first limiting block and the second limiting block, the first connecting wall comprises a first surface, the first relief slot is located between the first surface and the first end surface of the first signal terminal in the first direction.

9. The electrical connector according to claim 4, wherein a gap formed between the first protrusion and the first end portion of the first signal terminal along the second direction is X1, where 0.04 mm≤X1≤0.1 mm; and wherein a gap formed between the second protrusion and the first end portion of the first signal terminal along the second direction is X2, where 0.04 mm≤X2≤0.1 mm.

10. The electrical connector according to claim 9, wherein X1=0.05 mm, and X2=0.05 mm.

11. The electrical connector according to claim 4, wherein the first limiting block comprises a first inclined guide surface, the second limiting block comprises a second inclined guide surface, the first inclined guide surface and the second inclined guide surface jointly form a first bell mouth for guiding the first end portion of the first signal terminal.

12. The electrical connector according to claim 11, wherein the plurality of limiting blocks comprise a third limiting block, the terminal limiting slot comprises a second terminal limiting slot located between the second limiting block and the third limiting block, the limiting protrusion comprises a third protrusion provided on the third limiting block and a fourth protrusion provided on the second limiting block, the third protrusion protrudes toward the fourth protrusion in the second direction, and the fourth protrusion protrudes toward the third protrusion in the second direction; and wherein the conductive terminals comprise a second signal terminal, the end portion comprises a first end portion provided on the second signal terminal, the first end portion of the second signal terminal comprises a first end surface, and the first end portion of the second signal terminal is restricted between the third protrusion and the fourth protrusion.

13. The electrical connector according to claim 12, wherein the first signal terminal and the second signal terminal are disposed adjacent to each other in the second direction, the first signal terminal and the second signal terminal form a differential signal terminal pair, the conductive terminals comprise a first ground terminal located on one side of the differential signal terminal pair, and a second ground terminal located on the other side of the differential signal terminal pair.

14. The electrical connector according to claim 13, further comprising a first ground connection piece connecting the first ground terminal and the second ground terminal.

15. The electrical connector according to claim 12, wherein the relief slot comprises a second relief slot located between the second limiting block and the third limiting block in the second direction, the third limiting block comprises a third side surface exposed in the second relief slot, the second limiting block comprises a fourth side surface exposed in the second relief slot, a distance between the third side surface and the fourth side surface is greater than a width of the first end portion of the second signal terminal.

16. The electrical connector according to claim 15, wherein the insulating body comprises a second connecting wall connecting the second limiting block and the third limiting block, the second connecting wall comprises a second surface, the second relief slot is located between the second surface and the first end surface of the second signal terminal in the first direction.

17. The electrical connector according to claim 16, wherein the third limiting block comprises a third inclined guide surface, the second limiting block further comprises a fourth inclined guide surface, and the third inclined guide surface and the fourth inclined guide surface jointly form a second bell mouth for guiding the first end portion of the second signal terminal.

18. An electrical connector, comprising:

an insulating body, the insulating body comprising a mating surface and a mating slot extending through the mating surface along a first direction;

a first terminal module, the first terminal module comprising a plurality of first conductive terminals and a first fixing block to fix the first conductive terminals, each first conductive terminal comprising a first elastic mating portion protruding into the mating slot and a first end portion extending from the first elastic mating portion;

a second terminal module, the second terminal module comprising a plurality of second conductive terminals and a second fixing block to fix the second conductive terminals, each second conductive terminal comprising a second elastic mating portion protruding into the mating slot;

a third terminal module, the third terminal module comprising a plurality of third conductive terminals and a third fixing block to fix the third conductive terminals, each third conductive terminal comprising a third elastic mating portion protruding into the mating slot; and a fourth terminal module, the fourth terminal module comprising a plurality of fourth conductive terminals and a fourth fixing block to fix the fourth conductive terminals, each fourth conductive terminal comprising a fourth elastic mating portion protruding into the mating slot;

wherein the first elastic mating portions of the first conductive terminals and the second elastic mating portions of the second conductive terminals are aligned in a vertical direction;

wherein the third elastic mating portions of the third conductive terminals and the fourth elastic mating portions of the fourth conductive terminals are aligned in the vertical direction;

wherein compared with the first elastic mating portions and the second elastic mating portions, the third elastic mating portions and the fourth elastic mating portions are disposed further away from the mating surface in the first direction;

wherein the insulating body comprises a first limiting block, a second limiting block, and a first terminal limiting slot located between the first limiting block and the second limiting block, the first limiting block comprises a first protrusion, the second limiting block comprises a second protrusion, the first protrusion protrudes toward the second protrusion in a second direction perpendicular to the first direction and the vertical direction, and the second protrusion protrudes toward the first protrusion in the second direction;

wherein the first conductive terminals comprise a first signal terminal having the first end portion, the first end portion of the first signal terminal comprises a first end surface, and the first end portion of the first signal terminal is restricted between the first protrusion and the second protrusion;

wherein the insulating body further comprises a first relief slot adjacent to the mating surface, the first relief slot and the first terminal limiting slot are in communication with each other in the first direction; and when the first signal terminal needs to be deformed, the first end portion of the first signal terminal is capable of moving unimpeded in the first relief slot.

19. The electrical connector according to claim 18, wherein the first limiting block comprises a first inclined guide surface, the second limiting block comprises a second inclined guide surface, the first inclined guide surface and the second inclined guide surface jointly form a first bell mouth for guiding the first end portion of the first signal terminal.

20. The electrical connector according to claim 18, wherein a gap formed between the first protrusion and the first end portion of the first signal terminal along the second direction is X1, where $0.04\ mm \le X1 \le 0.1\ mm$; and wherein a gap formed between the second protrusion and the first end portion of the first signal terminal along the second direction is X2, where $0.04\ mm \le X2 \le 0.1\ mm$.

* * * * *